United States Patent
Vuillemin et al.

(10) Patent No.: US 9,617,954 B2
(45) Date of Patent: Apr. 11, 2017

(54) PRIMARY COWL OF A TURBOFAN COMPRISING A ROTATING RING HAVING MICRO-JETS

(71) Applicant: SNECMA, Paris (FR)

(72) Inventors: Alexandre Alfred Gaston Vuillemin, Marseilles (FR); Guillaume Bodard, Verneuil l'Etang (FR); Sebastien Jean-Paul Aeberli, Paris (FR)

(73) Assignee: SNECMA, Paris (FR)

( * ) Notice: Subject to any disclaimer, the term of this patent is extended or adjusted under 35 U.S.C. 154(b) by 460 days.

(21) Appl. No.: 14/346,602

(22) PCT Filed: Sep. 24, 2012

(86) PCT No.: PCT/FR2012/052123
§ 371 (c)(1),
(2) Date: Mar. 21, 2014

(87) PCT Pub. No.: WO2013/041818
PCT Pub. Date: Mar. 28, 2013

(65) Prior Publication Data
US 2014/0245715 A1    Sep. 4, 2014

(30) Foreign Application Priority Data

Sep. 23, 2011   (FR) ...................................... 11 58477

(51) Int. Cl.
*F02K 1/28*       (2006.01)
*F02K 1/34*       (2006.01)
(Continued)

(52) U.S. Cl.
CPC .................. *F02K 1/34* (2013.01); *F02K 1/28* (2013.01); *F02K 1/30* (2013.01); *F02K 1/38* (2013.01);
(Continued)

(58) Field of Classification Search
CPC . F02K 1/386; F02K 1/46; F02K 3/075; F02K 1/28; F02K 1/30; F02K 1/34; F02K 1/38; F02C 6/08; F02C 9/18
See application file for complete search history.

(56) References Cited

U.S. PATENT DOCUMENTS

2003/0213227 A1* 11/2003 Balzer .................... B64D 33/06
60/204
2004/0187474 A1   9/2004 Martens et al.
(Continued)

FOREIGN PATENT DOCUMENTS

| EP | 1 464 822 | 10/2004 |
|----|-----------|---------|
| EP | 1 884 649 | 2/2008  |
| EP | 2 090 769 | 8/2009  |

OTHER PUBLICATIONS

International Search Report Issued Jan. 17, 2013 in PCT/FR12/052123 Filed Sep. 24, 2012.

*Primary Examiner* — Jermie Cozart
(74) *Attorney, Agent, or Firm* — Oblon, McClelland, Maier & Neustadt, L.L.P.

(57) ABSTRACT

The invention relates to a primary cowl for a turbofan comprising a primary body generating a primary stream to be ejected through a primary nozzle, and a secondary body generating a secondary stream to be ejected through a secondary nozzle, the primary cowl being shaped so as to be positioned downstream from the primary body and to define, on the inside of the turbofan, the path followed by the primary stream downstream from the primary nozzle and, on the outside, the path followed by the secondary stream downstream from the secondary nozzle. The primary cowl comprises a coupling to a system for supplying a pressurized gas and at least one perforation for injecting the pressurized gas, through the perforation, into the secondary stream. The primary cowl preferably comprises a ring which has perfo- (Continued)

rations and which is rotated about the axis of rotation of the turbofan.

8 Claims, 2 Drawing Sheets

(51) Int. Cl.
*F02K 1/30* (2006.01)
*F02K 3/02* (2006.01)
F02K 3/075 (2006.01)
F02K 1/46 (2006.01)
F02K 1/38 (2006.01)

(52) U.S. Cl.
CPC .............. *F02K 3/025* (2013.01); *F02K 1/386* (2013.01); *F02K 1/46* (2013.01); *F02K 3/075* (2013.01); *Y02T 50/671* (2013.01)

(56) References Cited

U.S. PATENT DOCUMENTS

| | | |
|---|---|---|
| 2004/0237501 A1 | 12/2004 | Brice et al. |
| 2005/0223691 A1* | 10/2005 | Viswanathan .......... F02K 1/386 60/204 |
| 2008/0112802 A1* | 5/2008 | Orlando ................... F02K 1/08 415/208.1 |
| 2008/0141656 A1 | 6/2008 | Beutin et al. |

* cited by examiner

PRIMARY COWL OF A TURBOFAN COMPRISING A ROTATING RING HAVING MICRO-JETS

BACKGROUND OF THE INVENTION

Field of the Invention

The field of the present invention is that of turbine engines and more particularly that of devices for reducing the noise produced by these turbine engines.

Description of the Related Art

Commercial aircraft are generally provided with turbofans, which are made up of a gas turbine driving a ducted fan, this being generally placed upstream of the engine. The air mass sucked in by the engine is divided into a primary stream, which circulates in the gas turbine or primary body, and a secondary stream, which comes from the fan, the two streams being concentric. The primary stream exits the fan in order to move into the primary body where it is compressed again, heated in a combustion chamber, guided to successive stages of turbines, then ejected in a primary gas stream. The secondary stream is compressed by the ducted fan stage, then ejected directly without having been heated. The two streams can be ejected separately in two concentric streams or mixed in a same channel prior to ejection.

The turbofan is conventionally housed in a nacelle which is shaped such as to make the aerodynamic drag as weak as possible; the nacelle comprises a first part, upstream, which surrounds the fan and a second part, downstream, which forms a fairing for guiding the secondary stream. The primary stream is, in the downstream part thereof, guided between a case of the engine, called a primary cowl, and a conical case which encloses the engine at the rear and which is generally called a tail cone. The fairing of the nacelle forms, with the primary cowl, an ejection nozzle for the secondary stream, whereas the first cowl forms, with the tail cone, an ejection nozzle for the primary stream.

The reduction of the noise caused by the jet of turbofans is a constant concern for aircraft manufacturers and engine builders and various solutions have been proposed therefor.

One of the current means used is chevrons which are installed on the primary nozzle of the engine. This technology is currently employed mainly on engines having separate streams. However, if it is quite effective from a sound point of view, it nevertheless has a negative effect on cruise performance.

Another solution envisaged by manufacturers consists in using micro-jets on the cowls surrounding the primary stream and/or the secondary stream. These micro-jets are circularly distributed in azimuth on the cowls and inject air into the corresponding jet, according to various angles of incidence and sideslip. However, studies carried out on various devices have shown that the sound gains which can be obtained by the control systems of this type remain limited, and this can be attributed to the lack of capacity for action of this method of control by external jets in the sound production areas, in this case downstream of the ejection nozzles, and on the dynamics of the flow coherent structures. Indeed, with devices located on the outside of the jet, in particular at the lip of the nozzle, the disturbance introduced is quickly assimilated by the turbulence of the layer where the two streams are mixed. The impact of this disturbance on the development of the turbulence depends then more on modifying the initial conditions of the mixing layer than on a direct action on the flow downstream areas, which is where the main sources of noise are located.

BRIEF SUMMARY OF THE INVENTION

The aim of the present invention is to overcome these disadvantages by proposing a new device for reducing the jet noise of turbofans, which performs better than the current devices and which does not impact upon the cruise performance of these turbofans, whether for thrust or specific consumption.

To this end, the aim of the invention is a cowl for a turbofan including an external surface extending about a rotation axis and being connected to a pressurized gas supply system, said external surface including at least one perforation for injecting this pressurized gas, through this perforation, characterized in that it includes at least one ring bearing said perforation(s), which is rotatable about said axis in relation to the external surface, and the external face of which is located in the extension of said cowl such as to recreate continuity with the external surface thereof.

The presence of a perforation on the primary cowl allows, by adjusting the conditions for injecting a pressurized gas in relation to the static pressure in the secondary stream, an unsteady flow phenomenon to be created along the primary cowl which continues along the entire length of this cowl and beyond, and therefore allows the jet noise generated by the secondary stream to be reduced. The rotation of a ring bearing said perforation(s) creates an unsteady phenomenon due to the alternation, in a given plane, of a disturbance as a result of the jet passing and of a period of calm which lasts until the following perforation moves into this plane. Moreover, the creation of this rotating ring, while leaving the rest of the primary cowl fixed, lightens the device in an extremely substantial manner.

Advantageously, the perforation is shaped such that the jet passing through it is at an angle of between 20° and 90° to the longitudinal direction of said external surface. The aim of this orientation is to make the jet penetrate as much as possible inside the primary stream and better generate the unsteady phenomenon.

In a particular embodiment, the perforation is shaped such that the jet is injected perpendicular to the surface of said cowl.

Preferably, the cowl includes between two and eight perforations, said perforations being regularly distributed on the circumference thereof. A minimum number of two perforations allows a symmetry to be maintained in the adopted configuration and the vibration generating factors to be reduced, whereas too high a number of perforations presents, as regards diameter of the perforations and injection speed which are equivalent, the disadvantage of an air bleed rate which is too large.

The invention also relates to an assembly made up of a cowl as described above and of a pressurized gas supply system delivering a constant pressure.

Finally, the invention relates to a turbofan including a primary body generating a primary stream intended to be ejected by a primary nozzle and a secondary body generating a secondary stream which is intended to be ejected in a secondary nozzle, said turbofan being provided with an assembly as described above, in which said cowl is positioned downstream of the primary body and defines, on the inside of the turbofan, the path followed by said primary stream downstream of the primary nozzle and, on the outside, the path followed by said secondary stream downstream of the secondary nozzle and wherein said injection system injects said pressurized gas into the secondary stream.

Advantageously, the axial position of the ring along the primary cowl is positioned, upstream of the primary ejection section, at a distance less than 1.5 times the diameter of the primary stream at said ejection section. This dimensioning allows an unsteady flow phenomenon to be created over a large length of the primary cowl and, therefore, the noise generated along and beyond this primary cowl to be reduced.

The invention also relates to a turbofan as described above wherein the pressurized gas supply system is dimensioned in order to provide, at each perforation, a flow rate which is less than or equal to 0.2% of the flow rate of the secondary stream.

BRIEF DESCRIPTION OF THE SEVERAL VIEWS OF THE DRAWINGS

The invention will be better understood, and other aims, details, features and advantages thereof will emerge more clearly in the course of the following detailed explanatory description of an embodiment of the invention given by way of example which is purely illustrative and non-limiting, with reference to the appended schematic drawings, wherein.

DETAILED DESCRIPTION OF THE INVENTION

Figure 1:
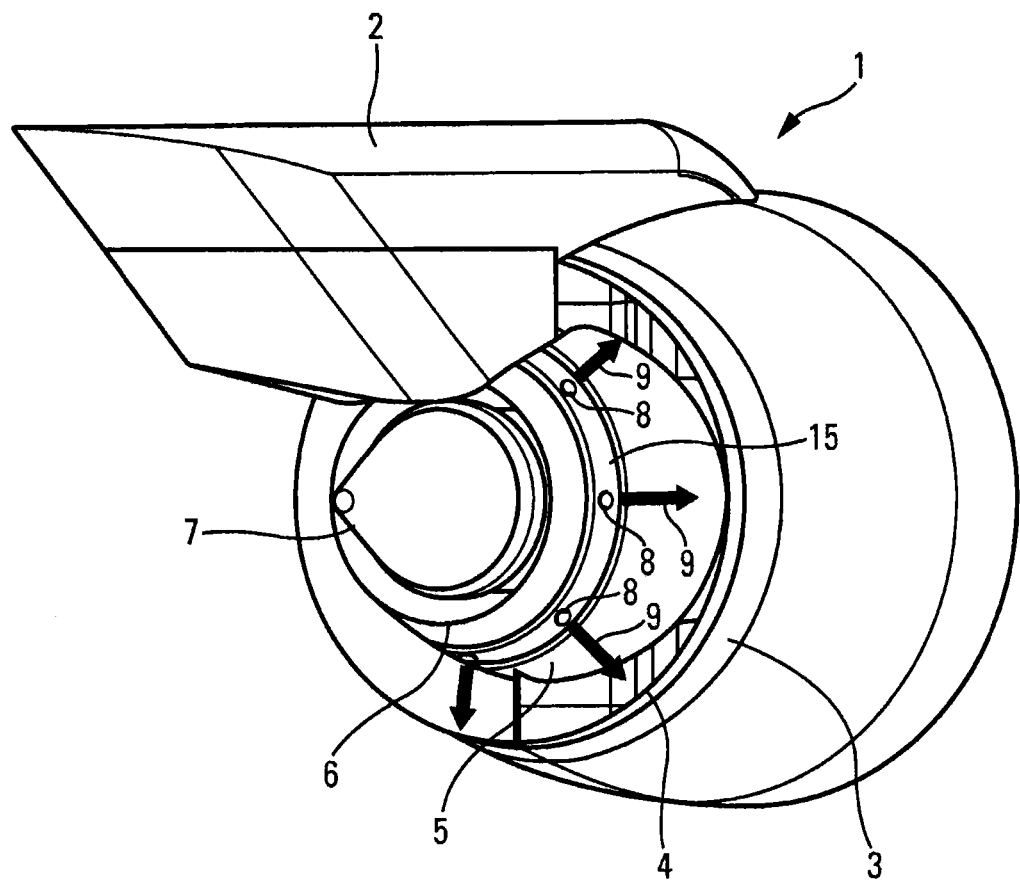
FIG. 1 is a perspective view, from the rear, of a turbofan provided with a noise reducing device according to an embodiment of the invention.

FIG. 1 shows a turbofan 1, with a high bypass ratio, mounted on the pylon 2 of an aircraft (not shown). The turbofan 1 comprises a nacelle, the front part of which surrounds the fan and the rear part, or secondary cowl 3, of which forms, with the external part of the primary cowl 5, the ejection nozzle 4 for the secondary stream. The primary body of the turbofan is enclosed in a series of cases terminating downstream with the primary cowl 5 which separates the primary and secondary streams. On the inside, the primary stream is channeled by the tail cone 7 which forms, with the internal part of the primary cowl 5, the ejection nozzle 6 for the primary stream.

The primary cowl 5 is cut circularly downstream of the secondary ejection nozzle 4, in order to leave space for a ring 15, the external face of which is located in the extension of the cowl such as to recreate continuity in the secondary stream. Unlike the primary cowl which is fixed, this ring is rotatable about the axis of the engine. Moreover, it has a series of perforations 8 which are regularly distributed on the periphery thereof. These perforations, the aim of which is the injection of micro-jets 9 of pressurized air into the secondary stream, are orientated such as to provide this injection in a radial plane, in relation to the axis of rotation of the engine 1. Although it cannot be seen in FIG. 1, the ring 15 rotates about the axis of rotation of the engine, such that the direction of the micro-jets 9 is constantly modified.

Figure 2:
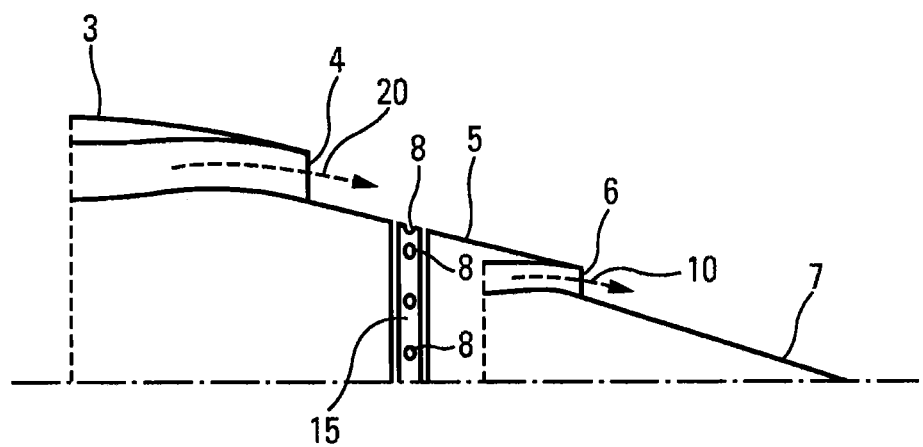
FIG. 2 is a sectional schematic view of the engine of FIG. 1.

FIG. 2 shows the rear part of the turbofan 1. The secondary cowl 3 and the primary cowl 5, which are both cylindrically shaped, channel the secondary stream 20, whereas the primary stream 10 is channeled by the internal face of the primary cowl 5 and by the tail cone 7. The rotating ring 15 can be seen in this figure, which ring is inserted into the thickness of the primary cowl 5 and is rotated by a device which will be explained in detail below. The perforations 8 are supplied with pressurized air by a supply system which will be described in detail with reference to FIG. 3.

Figure 3:
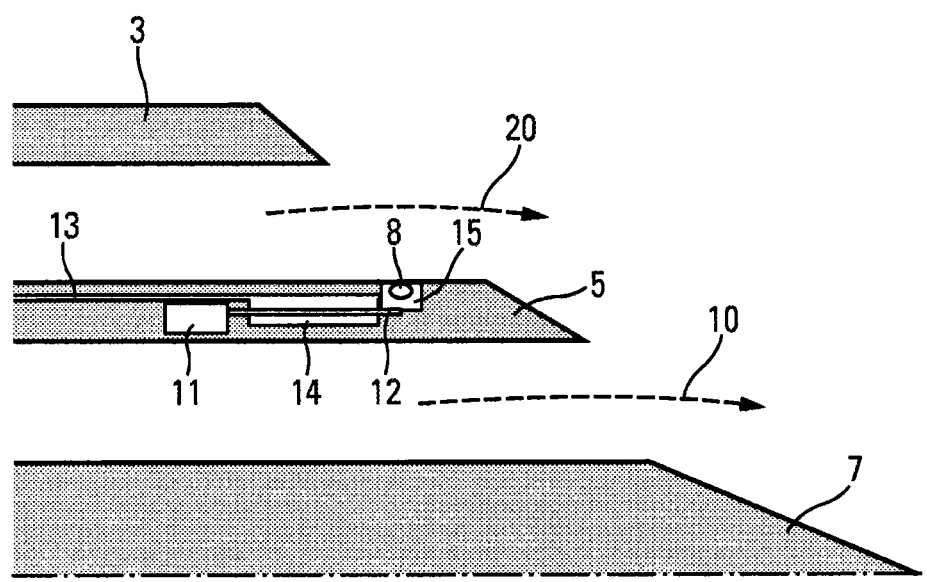
FIG. 3 is a sectional schematic view of the rear part of the turbofan of FIG. 1.

FIG. 3 shows, in a detailed manner, the most downstream part of the engine, with the secondary stream 20 which is channeled between the primary cowl 5 and the secondary cowl 3. Inside this primary cowl 5, which is fixed, is mounted, in a rotating manner, the ring 15 using supporting and rotating means such as gearing, rolling bearings and bearings, which are not shown. In the embodiment shown in the figure, the ring 15 is rotated by a motor 11 which transmits the movement by means of a rotation rod 12, which meshes on the ring 15, for example by means of a toothed wheel. The perforations 8 are supplied with air by bleeding from a stage of the compressor which sends the bled air, via a supply line 13, into a supply chamber 14. This chamber is connected with the inside of the ring 15 in order to supply the perforations 8 and generate micro-jets 9 at the outlet thereof. In an alternative, which is not shown, the ring 15 is made up by the assembly of the primary cowl 5 which is rotated by means of drive devices and reduction gears mechanically connected to one of the rotating shafts of the engine.

Several orientations are possible for the micro-jets 9 which are injected into the secondary stream downstream of the secondary ejection nozzle 4. As shown in FIG. 1, these micro-jets are orientated radially, in relation to the axis of rotation of the engine, but other injection angles are also possible, the preferred orientation being between 20° and 90° from the axis of rotation of the engine. In all cases, the jets are injected with a direction and a linear momentum such that they penetrate deeply inside the secondary stream and do not spread by mixing immediately with this stream in order to flow along the external wall of the cowl 5.

The operation of the device, according to the invention, for reducing the noise of a turbofan will now be described.

The proposed technology mainly involves rotating a perforated ring borne by the primary cowl 5, and providing it with two or more jets of compressed air, which are distributed in azimuth on the periphery thereof and which output this air continuously. The continuous rotational movement of the jets therefore introduces an unsteady component into the secondary stream, due to the fact that, in a same radial plane, the passing of a jet and then absences of disturbance follow one another chronologically. The flow dynamics obtained are then closer to those of a wake than those of a mixing layer. It can therefore be expected that this disturbance introduced in the flow is not assimilated too quickly by the turbulence of the mixing layer and that it maintains the coherent nature thereof over a large axial range, or even up to the end of the primary cowl and the confluence of the two primary and secondary streams.

The proposed device is further characterized by the high degree of simplicity thereof:
  the development thereof is relatively simple since it uses only a limited number of parameters, such as the number and the position of the perforations 8, the flow rate of the jets and the rotational speed to be given to the ring 15 of the primary cowl 5,
  there is no mechanical piece which can be vibrated, which therefore improves the reliability of the device,
  it only requires low energy consumption, as a result of the small mass that is moved, it only requires the addition of very few pieces, which means less extra onboard mass, it is installed inside the primary cowl, at a location where there is generally unused space, it does not require modification of the shape of the primary cowl, and therefore does not bring about an aerodynamic loss.

In a preferred embodiment, the device is designed with the following particular parameters:

the number of perforations 8 injecting compressed air varies between two and eight depending on the diameter of the primary cowl. The micro-jets 9 coming from these perforations are regularly spaced in azimuth, such as to maintain the symmetry of the geometry of the rear of the turbofan. Maintaining the symmetry allows some of the vibration problems which can occur on rotating structures to be overcome. The angle of penetration of the micro-jets into the secondary stream can vary between 20° and 90°, in relation to the axis of the jet according to the envisaged hypothetical case. In particular, the jets can be orientated perpendicular to the external wall of the primary cowl 5.

the flow rate of the micro-jets 9 is defined as a percentage of the flow rate of the secondary stream, which allows the invention to be adapted to the size of the various existing turbofans.

After testing, it appears that these jets remain effective with a flow rate which does not exceed, per perforation 8, 0.2% of the secondary jet. It is preferably between 0.05% and 0.2%. Consequently, even if the ring 15 is provided with 8 perforations, the flow rate injected by these perforations, and which is bled from the air output from the high-pressure compressor, will remain less than 2% of the flow rate of the secondary jet. Such a bleed value remains compatible with good operation of the engine, while not excessively impacting upon the thrust performance thereof during takeoff. Outside of the takeoff stages, and particularly when cruising which is when the problems of noise generated by the turbofan are less substantial, it is envisaged that the noise reducing device is disabled in order to not affect the thermodynamic efficiency or the performance of the turbofan as was the case in the systems of the prior art.

the pressure within the injection system which supplies the micro-jets can be fixed at a value such that the speed of the air of the micro-jets is at the sonic maximum as the perforations 8 pass. The greater the pressure, the better the penetration of the micro-jets into the secondary stream and the better the associated reduction in noise.

the size of the perforations 8 can vary, depending on the number of perforations 8 which are made on the ring 15 of the primary cowl 5 and the retained injection pressure, from 1 cm to 5 cm in diameter.

the axial position of these perforations along the primary cowl, upstream of the primary ejection section 6, can vary between 0 and 1.5 times the diameter of the primary stream at the ejection section 6 thereof. This dimensioning allows an unsteady flow phenomenon to be created over a large length of the primary cowl and, therefore, the noise generated along and beyond this primary cowl to be reduced.

the temperature of the injected air is preferably between the temperature of the primary stream and that of the secondary stream.

the rotational speed given to the ring 15 is dependent on the size thereof and, therefore, on that of the engine on which it is mounted.

The device according to the invention has been described with a continuous injection of compressed air from a rotating ring 15 incorporated into the primary cowl 5, the result of which is to create an unsteady fluid injection in the secondary stream 20, the origin of which is placed at the centre of this secondary stream. The unsteady nature comes, as already indicated above, from the alternation, in a given radial plane, of a disturbance due to the jet 9 passing and a period of calm which lasts until the following perforation 8 passes. Other devices which provide the same function can be envisaged, which also fall within the scope of the present invention.

For example, this unsteady injection could be achieved using fixed injectors borne by a primary cowl 5, without a rotating ring, by organizing a drawn modulation of the pressure applied to the air which passes through the perforations 8. Modulation of the pressure would then create the desired unsteadiness within the secondary stream and the dynamics which produce noise reduction.

The invention claimed is:

1. A primary cowl for a turbofan, including an external surface extending about a rotation axis,
    said external surface including at least one perforation configured to be connected to a pressurized gas supply system for injecting the pressurized gas, through said at least one perforation,
    wherein said cowl includes at least one ring bearing said at least one perforation, said ring being rotatable about said axis in relation to the external surface, and an external face of said ring is located in the extension of the external surface of said cowl.

2. The cowl as claimed in claim 1, wherein the perforation is shaped such that the jet passing through said perforation is at an angle of between 20° and 90° to the longitudinal direction of said external surface.

3. The cowl as claimed in claim 2, wherein the perforation is shaped such that the jet is injected perpendicular to the external surface of said cowl.

4. The cowl as claimed in claim 1 including between two and eight perforations, said perforations being regularly distributed on a circumference of said ring.

5. An assembly comprising:
    a primary cowl for a turbofan, including an external surface extending about a rotation axis, said external surface including at least one perforation configured to be connected to a pressurized gas supply system for injecting the pressurized gas, through said at least one perforation,
    wherein said cowl includes at least one ring bearing said at least one perforation, said ring being rotatable about said axis in relation to the external surface, and an external face of said ring is located in the extension of the external surface of said cowl; and
    the pressurized gas supply system connected to said at least one perforation of said cowl, said supply system delivering a constant pressure.

6. A turbofan comprising:
    a primary body generating a primary stream intended to be ejected by a primary nozzle and a secondary body generating a secondary stream which is intended to be ejected in a secondary nozzle;
    a cowl including an external surface extending about a rotation axis, said external surface including at least one perforation configured to be connected to a pressurized gas upply system for injecting the pressurized gas, through said at least one perforation, wherein said cowl includes at least one ring bearing said at least one perforation, said ring being rotatable about said axis in relation to the external surface, and an external face of said ring is located in the extension of the external surface of said cowl; and the pressurized gas supply system connected to said at least one perforation of said cowl, said supply system delivering a constant pressure, wherein the cowl is positioned downstream of said primary body and defines, on an inside of the turbofan, a path followed by said primary stream downstream of the primary nozzle and, on an outside, a path followed by said secondary stream downstream of the secondary nozzle and wherein said pressurized gas supply system injects said pressurized gas into the secondary stream.

7. The turbofan as claimed in claim 6, wherein an axial position of the ring along the primary cowl is positioned, upstream of a primary ejection section, at a distance less than 1.5 times a diameter of the primary stream at said primary ejection section.

8. The turbofan as claimed in claim 6, wherein the pressurized gas supply system is dimensioned in order to provide, at each perforation, a flow rate which is less than or equal to 0.2% of a flow rate of the secondary stream.

* * * * *